US006205690B1

(12) United States Patent
Heropoulos et al.

(10) Patent No.: US 6,205,690 B1
(45) Date of Patent: Mar. 27, 2001

(54) PANELS WITH ANIMATION AND SOUND

(75) Inventors: George W. Heropoulos, San Jose, CA (US); Tamas L. Torma, Canmore (CA)

(73) Assignee: XS Energy International, Inc., Knoxville, MD (US)

( * ) Notice: Subject to any disclaimer, the term of this patent is extended or adjusted under 35 U.S.C. 154(b) by 0 days.

(21) Appl. No.: 08/685,238

(22) Filed: Jul. 23, 1996

(51) Int. Cl.[7] ................................................. G09F 13/00
(52) U.S. Cl. ............................ 40/442; 40/544; 40/455; 40/463
(58) Field of Search .................. 40/446, 455, 457, 40/463–465, 544, 427

(56) References Cited

U.S. PATENT DOCUMENTS

| 4,532,395 | 7/1985 | Zukowski | 200/314 |
|---|---|---|---|
| 4,683,360 | 7/1987 | Maser | 200/314 |
| 4,703,573 | 11/1987 | Montgomery et al. | 40/455 |
| 5,087,043 | 2/1992 | Billings et al. | 273/157 R |
| 5,359,341 | * 10/1994 | Hutchings | 345/45 |
| 5,461,188 | * 10/1995 | Drago et al. | 84/600 |

* cited by examiner

*Primary Examiner*—Cassandra H. Davis
(74) *Attorney, Agent, or Firm*—Oppenheimer Wolff & Donnelly LLP

(57) ABSTRACT

A panel, page or substrate is provided having a tier of electroluminescent (EL) material which forms a pattern corresponding to a series of images. When illuminated in accord with a predetermined sequence, the series of images provide an illusion of movement. A sound generator is provided to produce a predetermined audible response associated with the predetermined sequence. One or more flexible membrane switches are coupled to simultaneously activate both the EL material and the sound generator when depressed. A layer bearing a plurality of icons, with each of said plurality of icons being associated with one of a first and second set of icons. The first set of icons is adapted to be viewable with an unaided eye on a continuous basis, and the second set of icons comprises the pattern of the EL material and are selectively viewable with the unaided eye, when the EL material illuminates. The sound produced by the generator may or may not be a succession of audible responses corresponding to the predetermined sequence. Each audible response of the succession may or may not be uniquely associated with one of the icons.

20 Claims, 4 Drawing Sheets

PANELS WITH ANIMATION AND SOUND

TECHNICAL FIELD

The present invention relates to entertainment or educational pages or panels having animation and stored sound recordings operated by a user.

BACKGROUND ART

Electroluminescent (EL) devices, used in pages, panels, displays and board games, generally comprise a layer of phosphor disposed between two electrodes, at least one of which is light-transmissive. A dielectric is also disposed between the electrodes, so the EL device functions essentially as a capacitor. When a voltage of alternating current is applied across the electrodes, the phosphor material is activated and emits light.

EL devices may be manufactured as discrete cells or as large panels or rolls and either on rigid or flexible substrates. In addition, each component of the device may be formed as a separate layer, such as a foil sheet serving as an electrode, and a planar dielectric sheet, with the layers later laminated together as by heat and pressure. Alternatively, the layers may be combined into overlapping coatings printed on a substrate, as is the case for a layer of light-transmissive conductive ink serving as a top electrode followed by a layer of phosphor ink in a dielectric matrix and then another conductive ink coating serving as a back electrode. EL devices have found widespread uses, e.g. in signs, watch faces, and as backlighting for keyboards.

U.S. Pat. No. 4,683,360 to Maser discloses a combined electroluminescent panel activated by a flexible membrane switch. The flexible membrane switch is generally constructed of two spaced-apart electrically conductive surfaces on separate substrates. At least one substrate is flexible. For example, each conductive surface may be a pattern of electrically conductive ink. A spacer layer with an aperture is positioned between the two facing conductive surfaces. When a user depresses the flexible substrate containing one of the conductive surfaces, the two conductive surfaces come into contact, thereby causing activation of the switch and closing a circuit.

U.S. Pat. No. 4,532,395 to Zukowski discloses a combination flexible membrane switch panel disposed adjacent to flexible EL material. The flexible membrane switch includes two spaced-apart electrically conductive surfaces on separate substrates with a spacer layer, having an aperture positioned therebetween. One of the conductive surfaces is flexible, with another flexible layer, having translucent indicia, positioned adjacent to and spaced apart therefrom. Disposed between the translucent indicia and the flexible membrane is a flexible layer of EL material. In this manner, both the indicia layer and the EL material may be depressed to allow operation of the flexible membrane switch.

Many interactive games and learning devices include flexible membrane switches to allow a user to control some elements of the stimuli these devices produce. In this fashion, the games and learning devices are more likely to hold the attention of a user for a longer period of time when compared to passive devices.

U.S. Pat. No. 5,087,043 to Billings et al. discloses an interactive audio-visual puzzle that includes, in pertinent part, a rigid puzzle form defining a predetermined number of form cutouts, an upper graphic disposed on the form upper surface and a plurality of respective removable puzzle pieces. Each of the puzzle pieces includes a peripheral configuration conforming to that of an associated form cutout and bears a piece graphic. A flexible membrane bears on the underside thereof, along with a plurality of conductors in a predetermined relative disposition. A plurality of respective lower graphics overlie the flexible membrane and underlie the form cutouts. A sound generator produces respective predetermined associated sounds in response to the input signals applied thereto. The flexible membrane conductors, space and ground plane cooperate to form a touch-pad which corresponds to each of the lower graphics electrically connected to the sound generator. In this manner, the sound generator is selectively actuated to produce sounds in response to input signals. A drawback with Billings et al. is that no animation is provided which would provide the puzzle with more appeal to a user.

U.S. Pat. No. 4,703,573 to Montgomery et al. discloses a visual audible activated work that includes, in pertinent part, at least two pages pivotally attached to each other so that the pages are pivotal from a juxtaposed closed position to an adjacent opened position. A liquid crystal display (LCD) is affixed to one of the pages. A sound generator is attached to the LCD, and a power supply is coupled to automatically provide power to both the sound generator and the LCD when the pages are paced in the opened position. A drawback with Montgomery et al. is that the LCD display limits the number and variety of interactive devices that may be present on any given page.

An object of the present invention, therefore, is to provide an interactive page or panel device with audio visual stimuli in which the visual aspect of the stimuli provides an illusion of movement.

Another object of the present invention is to provide an increased number of interactive devices per unit area than interactive devices of the prior art.

A further object of the present invention is to provide an audio visual system which is easily adaptable to existing interactive devices.

SUMMARY OF THE INVENTION

The above objects have been achieved by providing a substrate including a tier of electroluminescent (EL) material forming a pattern which corresponds to a series of images that provide an illusion of movement when illuminated in accord with a predetermined sequence. A sound generator is used to produce predetermined audible tones or words linked in meaning to the images. A flexible membrane switch is coupled to simultaneously activate both the EL material and the sound generator when depressed by a user. A layer includes a plurality of icons, with each of the plurality of icons being associated with one of a first and second set of illustrations. The first set of illustrations is adapted to be viewable with an unaided eye on a continuous basis, and the second set of illustrations comprises the pattern of the EL material and are selectively viewable with the unaided eye, when the EL material illuminates. The sound produced by the generator may or may not be a succession of audible responses corresponding to the predetermined sequence. Each audible response of the succession may or may not be uniquely associated with one of the illustrations of the second set.

An increased number of interactive devices/membrane switches may be provided in a given area by placing the first set of illustrations over both the EL material and the flexible membrane switches. To that end, an array of flexible membrane switches are provided, with each switch including a flexible membrane layer, having a first conductive element, and a contact layer, having a second conductive element. The flexible membrane layer is spaced apart from the contact layer, with the first and second conductive elements in opposing relation. An insulative layer includes an aperture which is positioned so that the aperture is disposed between the first and second conductive elements. The icon bearing layer is disposed adjacent to, but spaced apart from, the flexible membrane layer, with the EL layer disposed therebetween. By printing with various inks and on various surfaces, the EL devices can be used to make illustrations appear and disappear, as well as change color.

In addition, a sequencing circuit is operably connected to electrical circuitry associated with EL material. The sequencing circuit is typically triggered by the touch of a membrane switch, as with the circuitry for the simple illumination of the second set of illustrations. The sequencer is set for a specific pulse rate and order, causing timed and ordered activation of the EL material to illuminate the figures of the second set in accord with a predetermined sequence. Precise timing and ordering of the sequenced series in combination with careful placement of printed illustrations on icon bearing layer provides an illusion of motion associated with illustrations of the first set.

A typical layout for a icon bearing layer will have icons, membrane switches and text, which may be one any one of a plurality of substrates, e.g. board games, greeting cards, pages of a book, etc. Some of the icons are activated by membrane switches that cause simple illumination. Other portions of the icons appear animated upon activation by a membrane switch because of the sequencing circuit interposed in the circuitry of the EL material underlying those icons. Still other portions of the icons may remain unactivated and simply function as completions of the partially-activatable scene, or motif, on a substrate. In this manner, the unactivated icons are viewable with the unaided eye on a continuous basis. The text or the sound generator may indicate when the user is to depress a membrane switch so as to cause activation of some portion of the icons.

BEST MODE FOR CARRYING OUT THE INVENTION

Figure 1:
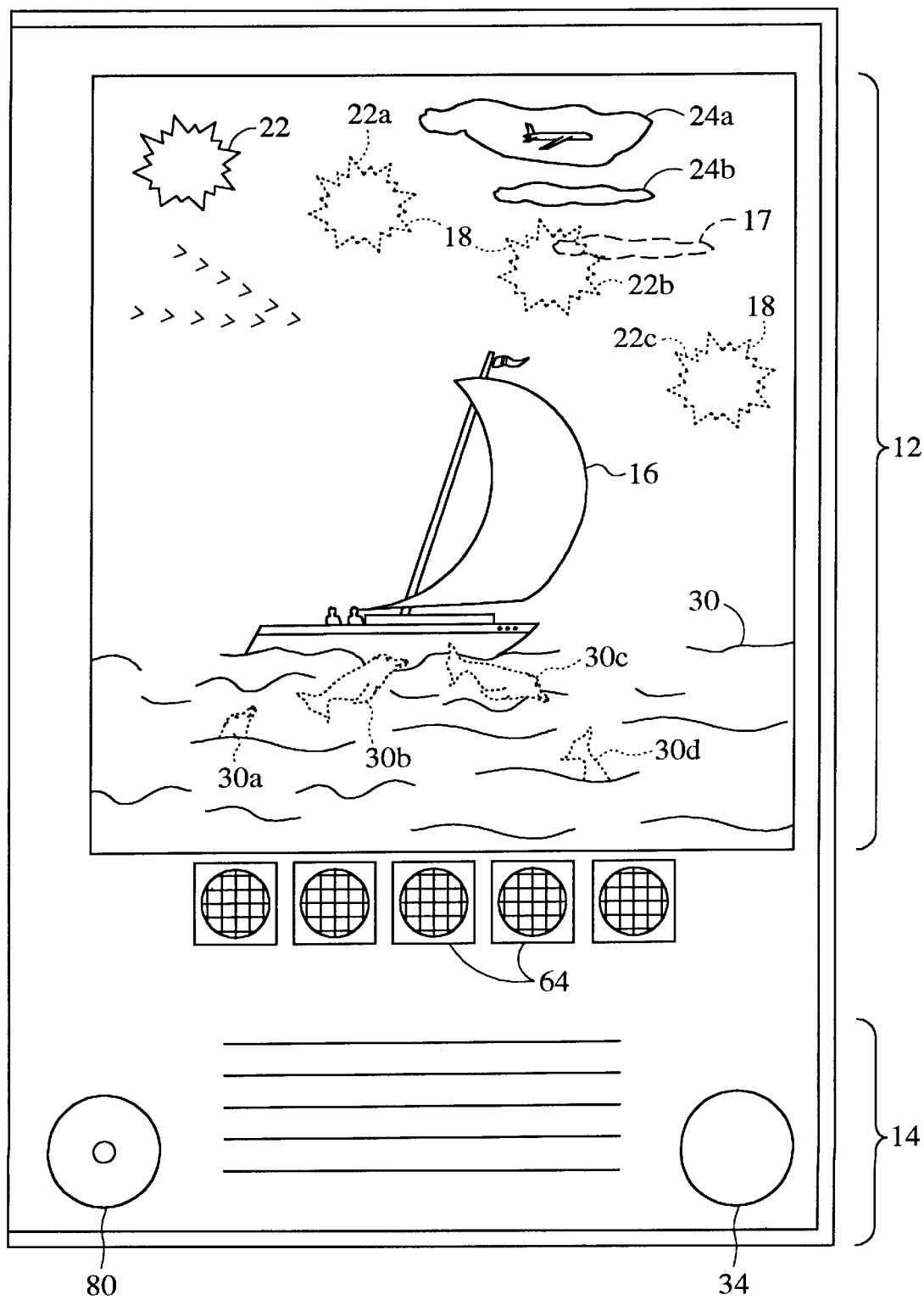
FIG. 1 shows a typical layout for an icon bearing layer which is associated with a substrate in accord with the present invention.
Figure 2:
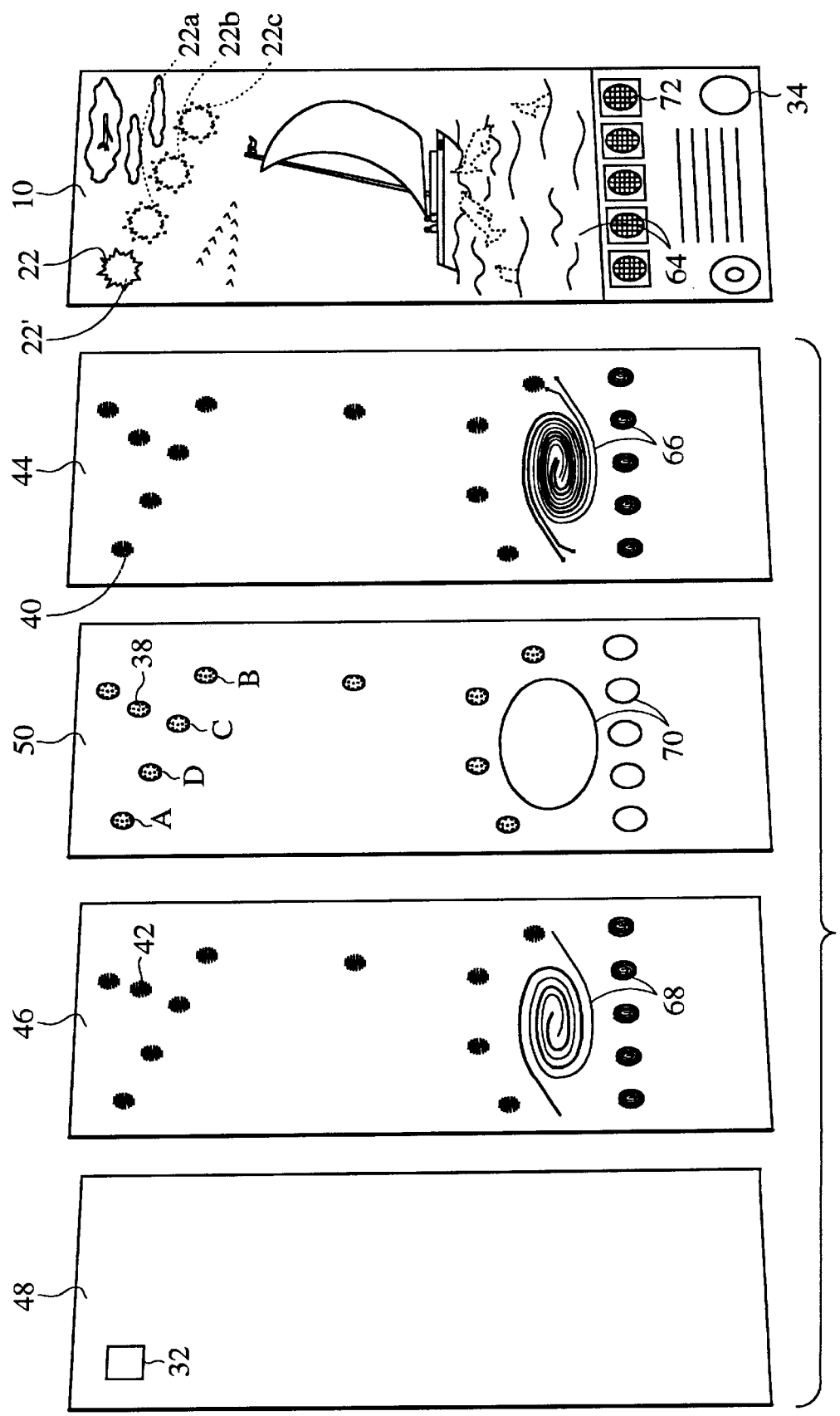
FIG. 2 is an exploded view of some of the layers of a typical substrate of the present invention, with most of the electrical circuitry removed.

With reference to FIGS. 1 and 2, a typical page layout for the icon bearing, printable layer 10 of a substrate contains a graphics portion 12 and a text portion 14. The substrate may be a greeting card, a page of a book, a panel or other sheet material. For purposes of description, the substrate will be an interactive board game. Graphics portion 12 and text portion 14 are shown in separate regions for ease of illustration and may be interspersed, e.g., with the text positioned proximate to a particular graphic providing detailed information about the same. Additionally, text may be illuminated according to the present invention.

Layer 10 typically includes two sets of icons. A first set of icons 16, shown with solid lines, are formed to be viewable with the unaided eye on an essentially continuous basis. In this manner, icons 16 reflect light which is incident thereon. A second set of icons 18, shown in dashed lines, are formed to be selectively viewable with the unaided eye. Typically, icons 18 are translucent regions, which are printed on the inner face only of layer 10. A layer of EL material 20 underlies layer 10 and is formed to luminesce in areas adjacent to the translucent regions, which correspond to icons 18. For example, an EL area may be positioned under sun 22, as well as areas 22a–c. Another EL area may be positioned to illuminate two closely-spaced parts of the illustration, such as clouds 24a–b. The icons may be the result of printing a positive silhouette, such as sun 22, on the outer face of printable layer 10 and a negative silhouette with dark ink directly underneath layer 10 adjacent to the positive silhouette and proximate to the areas 22a–c. This refinement confines the illumination of the EL material to a region of layer 10 associated with icons of either the first 16 or second 18 set. In this manner, illumination of icons 18 via EL material allows icons to seem as though they "appear out of nowhere" on the outer surface of printable layer 10. EL material 20 and printing can be combined to achieve a variety of effects. For example, a graphic may be printed on a translucent portion of a material of a single color and then change color when illuminated by an EL device of a different color. The icons themselves of the first set 16 may be illuminated, such as sun 22, or may be printed in dark ink and be backlighted when an EL device illuminates the background as is the case for the dark airplane in front of cloud 26. The graphics portion 12 may also contain non-activatable portions which simply complete the illustrated scene.

The shapes of the translucent regions are logically associated with one or more of the icons of the first set 16. For example, water 30 may be one of the icons of first set 16 and may have, associated therewith, dolphins 30a–d, which may be four of the icons of the second set 18. Dolphins 30a–d would not be viewable until EL material 20 is activated. To activate EL material 20, a plurality of switches/buttons 32 may be employed, or a microphone may be connected to allow voice activation of the EL material. Although switches are shown positioned in a region separate from graphics portion 12, it is preferred that switches 32 be positioned so as to lie underneath dolphins 30a–d. With this design, it is necessary to use flexible membrane switches, which are well known in the art. To operate the switches 32, it is understood that both EL material 20 and layer 10 must also be formed from a flexible material.

By properly sequencing the illumination of EL material 20, an illusion of motion may be achieved with respect to icons 18. In another instance, the icons may be printed on the inner surface of layer 10 in overlapping form, and the EL material may be set at a rate designed to provide a smoother appearance of motion. Overlapping EL areas could include sun 22b and cloud 17. Sun 22b and cloud 17 may be disposed so that they are not viewable until the EL area positioned underneath the same illuminates, as discussed above with respect to icons 18. In this fashion, at the initiation of the illumination sequence of 22c, 22b and sun 22a, the EL material associated with cloud 17 would be illuminated. Upon illumination of sun 22b, EL material corresponding to cloud 17 extinguishes, momentarily leaving only sun 22b illuminated. By carefully overlapping a succession of similar images in this manner, a relatively smooth appearance of motion may be achieved.

Figure 4:
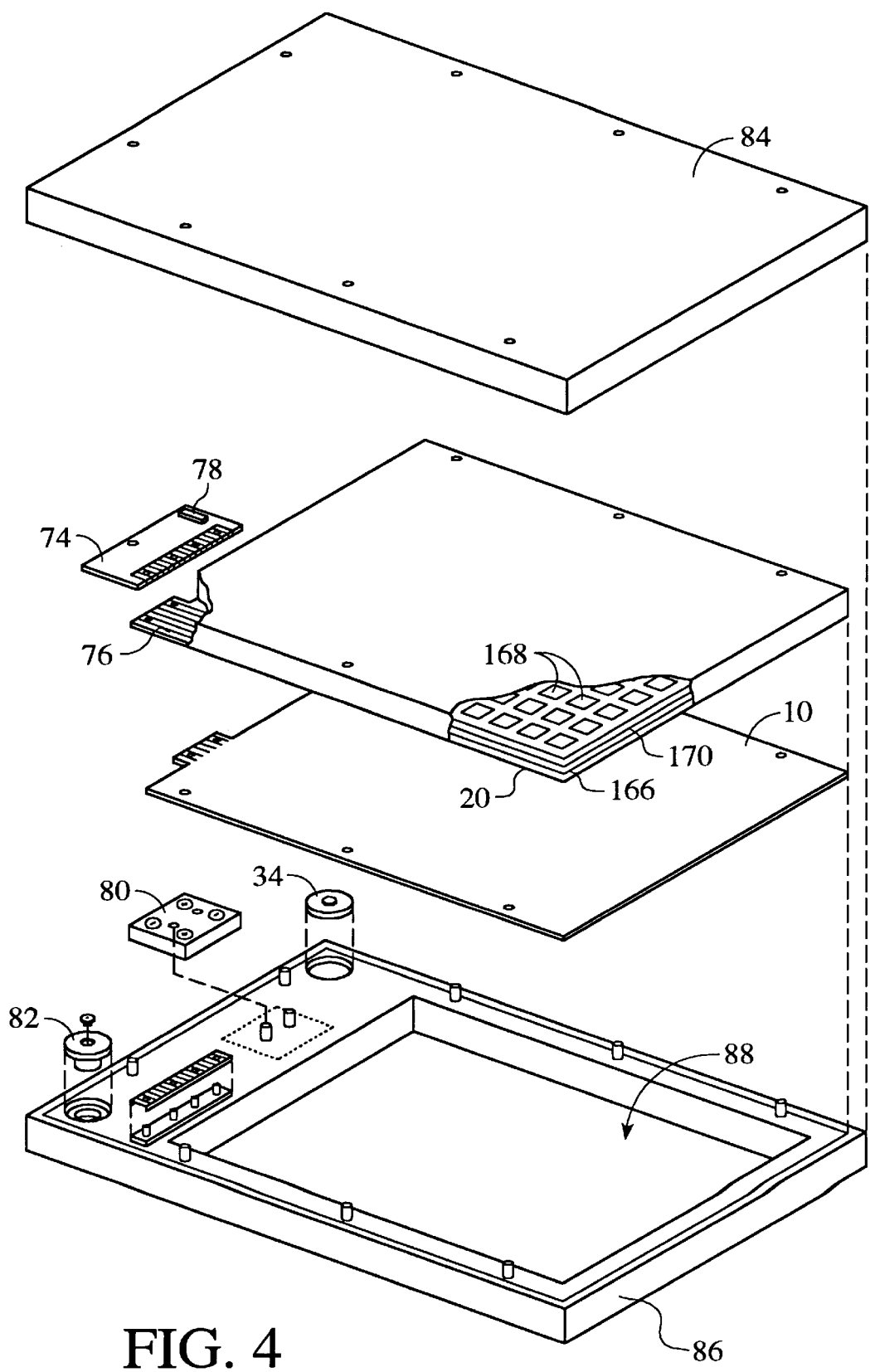
FIG. 4 is an exploded perspective view of electric circuitry and a housing associated with the present invention.

A sound generator, shown more clearly in FIG. 4, is coupled to a speaker 34 to produce an audible response which may be associated with icons of the first 16 second 18 sets. When the sequencing circuitry is properly timed and ordered with the icons and audible responses, visual animation may be achieved with corresponding audio accompaniment. For example, upon illumination of dolphin 30*a*, sound generator may produce the sound of breaking water to imitate the sound of a dolphin emerging from water 30. During the illumination of dolphins 30*b–c,* sound generator may produce the sounds of the dolphin clatter, or speech. In this fashion, the sound generator may produce a sequence of audible responses associated with the sequence of illumination of icons of the first 16 and second 18 sets. Further, each audible response in a sequence may be uniquely associated with the illumination of a particular icon of either the first 16 or second 18 sets.

If an amusing scenario is to be produced, the sound generator may imitate the sound of a jet air-liner, missile or Apollo-NASA Communications sequence during the illumination of dolphins 30*b–c,* exaggerating the flight of the same across water 30. Finally, upon illumination of dolphin 30*d,* sound generator may produce the sound of a large splash, emphasizing the return of the dolphin to water 30. The combined audio visual stimuli provides the full effects of a motion picture.

Layer 10 is shown with a printed positive silhouette 22 on its outer surface. A negative silhouette 22' of the same icon is printed on the backside, or inner surface, of layer 10, as also indicated by 22*a–c*. The icons may be printed with ink on the outer surface, inner surface, or both depending on the desired effect, as discussed above. Below layer 10 lies the EL material 20. EL material 20 of the present invention includes a plurality of electroluminescent regions each of which comprises of EL phosphor 38 disposed between a top conductor 40 and a bottom conductor 42. Preferably, each electroluminescent region is situated proximate to layer 10 for maximum brightness of the overlying icons of second set 18. For ease of illustration, EL material 20 has been separated into its components, but the connecting circuitry is not shown. Top conductor 40 is typically formed on EL polymer thick-film as an electrically conductive ink. Preferably, top conductor 40 is disposed on the underside, or inner surface, of layer 44 proximate to graphics of first set 18 and is light-transmissive to allow light from EL phosphor 38 to pass therethrough. Bottom electrode 42 is preferably disposed on the top, or outer surface, of layer 46. "Inner" and "outer" surfaces, as used here, refer to positions relative to a core or base, such as base substrate 48, of a typical display page or display sheet. EL phosphor 38 is typically in the form of a conductive ink disposed on a dielectric 50. Electroluminescent regions, shown in FIG. 2, correspond to selected icons of layer 10.

Although the various components of EL material 20 are shown as being incorporated in different segments of film, such as 44, 46 and 50, the present invention may be manufactured with all components of EL material 20 being "printed" directly on the inner surface of layer 10. The components are thus laid down as successive coatings of first conductive ink, phosphor, dielectric matrix material, and second conductive ink. A combination of the coating and separate layer methods may be used to effectively combine layers 10 and 44 or 46 and 48, so that the conductive ink patterns are printed directly on layers 10 or 48 and only a separate dielectric and phosphor layer is between them. This combination of layers is also applicable to the conductive ink traces for the membrane switches, described below. Other types of EL material, such as those utilizing foil electrodes or phosphor-impregnated resins may also be used.

Figure 3:
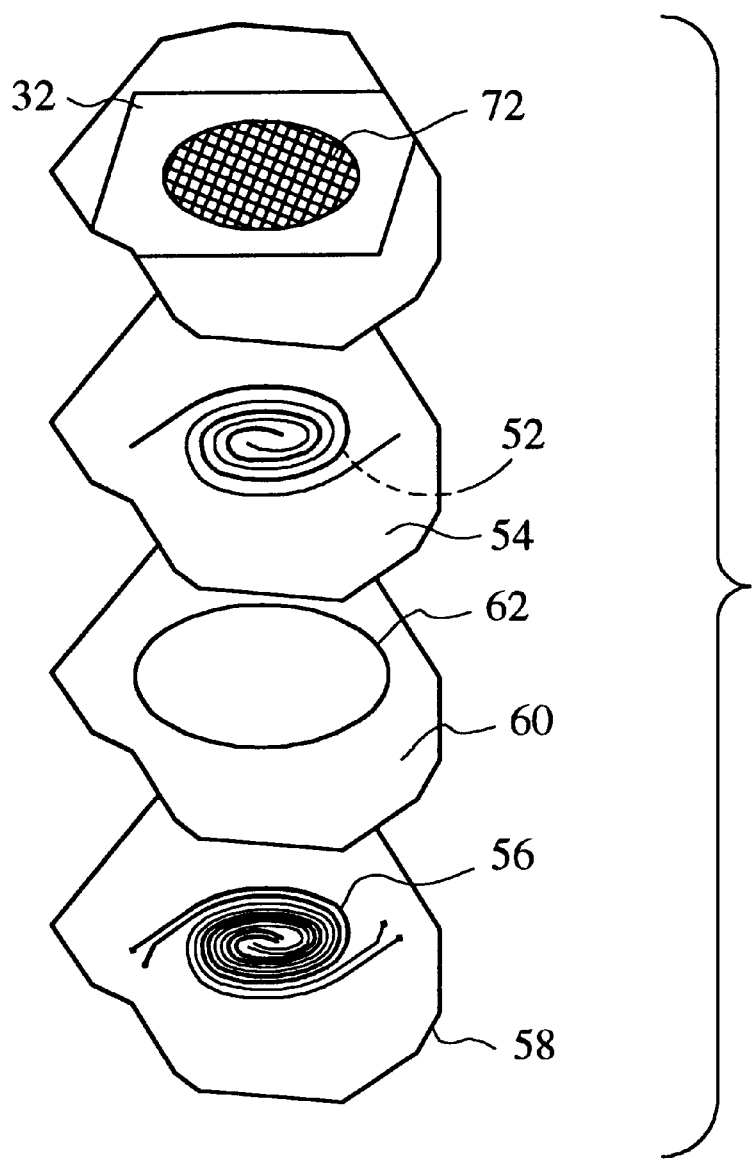
FIG. 3 provides an exploded view of a flexible membrane switch in accord with the present invention.

Referring also to FIG. 3, below selected icons are the inner components of flexible membrane switches 32. Switches 32 are shown without connecting circuitry for ease of discussion. Each membrane switch 32 includes a top pair of parallel spiral conductive ink traces 52 on a first surface, such as the underside of layer 54 and a bottom pair of parallel spiral conductive ink traces 56 on a second surface, such as the top surface of layer 58. The two sets of spirals are positioned to face each other, but are spaced apart with a spacer layer 60 of predetermined thickness. Spacer layer 60 contains apertures 62 which are aligned with the top and bottom sets of spirals 52 and 56, respectively. As discussed above, in the preferred embodiment, membrane switches 32 may be disposed underneath one of the electroluminescent regions of EL layer 20 which switch 32 will cause to illuminate. Upon depressing the selected icon on layer 10, the top spiral set 52 comes into contact with bottom spiral set 56 through aperture 62, thus activating switch 32, closing a circuit and illuminating electroluminescent regions of EL layer 20. To this end, switch 32 is typically positioned proximate to layer 48, with layer 10 and all of the intervening layers between switch 32 and layer 10 being flexible. Upon depressing the appropriate switch 32, an icon of the first set 16 may be provided motion by icons of the second set 18. For example, the sound generator may prompt a user with an audible response as follows: "Watch the sun rise". After hearing the aforementioned audible response, a user would press on icon 22. This would cause switch 32, shown on layer 48, to cause phosphor A to irradiate light. Timing circuitry, discussed later with respect to FIG. 4, would sequentially illuminate and unilluminate phosphor B, C, and D. This in turn would cause icons 22*c,* 22*b* and 22*a* to appear and disappear, leaving only icon 22 illuminated. After the illumination sequence of 22*c,* 22*b* and 22*a* has ended, an appropriate audible response could be generated.

In addition, some or all of switches 32 may not be disposed underneath EL material 20. Rather, some flexible membrane switches 64 may be formed in the same layers as EL material 20. In this manner, switch 64 may be disposed in the graphic portion 12 underneath a graphic associated with the first set 16, to indicate where a user can locate switch 64. Switch 64 includes a top pair of parallel spiral conductive ink traces 66 which may be disposed on surface 44, as well as a bottom pair of parallel spiral conductive ink traces 68, which may be on the top surface of layer 46, or base substrate 48. An aperture 70 may be positioned between top 66 and bottom 68 traces to perform the same functions as aperture 62, discussed above. Switches 64 not included in the graphic portion 12 typically have, associated therewith, an activation region 72 to indicate where the user should depress switch 64 to activate EL material 20. When the activation region 72 of a switch is depressed, top spiral set comes into contact with bottom spiral set, as discussed above.

Referring also to FIG. 4, an advantage with having the EL material 20 and layer 10 disposed above switch 32 is to make the present invention easily adaptable to existing board games that provide audio stimuli. Such games typically employ sound cards activated by flexible membrane switches. By layering both the EL material 20 and layer 10 over the existing flexible membrane switches, an existing audio board game may be easily upgraded to provide visual stimuli. The existing flexible membrane switches are coupled to both the EL material 20 and the sound generator to simultaneously activate both audio and visual stimuli. The visual stimuli provided may be designed to enhance the existing audio programming of the board game.

Alternatively, many of the preexisting board games may be easily reprogrammed to change the sounds generated to enhance the visual stimuli. In this manner, existing board games may be easily and inexpensively altered to keep apace with the rapidly changing trends of children's entertainment.

An additional benefit with the layered design concerns the efficient use of substrate on which the switches and EL material are disposed. Specifically, with the layered design, more switches per unit area may be disposed in the board game, providing more interactive devices for a user. For example, an array or matrix of switches may be included. Top conductive traces 166 may be disposed spaced apart from bottom conductive ink traces 170, with a plurality of corresponding apertures 168 disposed in an insulative layer therebetween, with corresponding electroluminescent regions being present. The advantage of having more interactive devices is that the game becomes more suitable for children of younger years. By placing the switch 32 underneath the icon which is the subject of attention, a one-to-one correspondence is facilitated between the icon and the visual response expected. This concept is easily demonstrated by considering the sound generator producing the aforementioned audible response of "Watch the sun rise". Upon hearing this prompt, a user would merely press on icon 22 to elicit the visual response discussed above, thereby providing a one-to-one correspondence between icon 22 and the visual response expected. If the sound generator prompted the user to "see the dolphins jump", the aforementioned correspondence is not present. The dolphins may not be seen, precluding the user from knowing where a switch is positioned to elicit the usual stimuli expected, i.e., the sequential illumination of dolphins 30a–d. Rather, a user would have to embark on an abstract association of water 30 with dolphins 30a–d. After making the aforementioned association, a user would understand the need to press on icon 30 to activate icons 30a–d. Many users of the present invention would not have developed the cognitive ability to make abstract associations. By placing switch 30 underneath an icon which is the subject of attention, less abstract thought processes need be utilized for a user to enjoy the interactive device. Simply put, the device becomes more suitable for users who have not developed the cognitive abilities necessary to successfully comprehend abstract associations.

The substrate of the present invention is preferably constructed using nonporous, flexible polymer substrate materials such as Mylar. Paper or fabric may also be used. It may be desirable to use core substrates and spacer layers that are semi-rigid, however, for durability. The printable layers are preferably 0.003 to 0.020" thick. The base substrate 48 is preferably 0.010 to 0.035" thick. Layers 44 and 46 are preferably 0.010 to 0.020" thick. The dielectric layer 50 varies depending on the voltage used, but a thickness of 0.010 to 0.030" is typical. Comparable dimension may be employed for flexible membrane switch layers 54, 58 and 60.

Each of the flexible membrane switches 32 is coupled to a printed circuit board (PCB) 74 via traces 76. A combination sound generator and sequencing circuit is disposed on the PCB 74 and may take the form of an integrated circuit coupled to speaker 34. A suitable power source, such as batteries 80, are provided to power the device. A power button 82 is coupled to the power source to selectively actuate the interactive device. A housing is provided which includes upper 84 and lower 86 casings. Upper casing 84 includes a window 88. Additional openings are provided to mount button 82 and speaker 34 so that they may be operationally coupled to upper casing 84. Layer 10 is mounted to be adjacent to window 88, with EL material 20 disposed adjacent thereto. Spaced apart from the EL material 20 is an array of flexible membrane switches. Disposed between the EL material 20 and the switch array are traces 76, with lower casing 86 fastening to upper casing 84 via screws or the like.

What is claimed is:

1. An interactive display panel comprising:
    a layer bearing a plurality of icons, each of said icons being associated with one of a first set and a second set of icons;
    a tier of electroluminescent material forming a pattern corresponding to said second set of icons, said pattern providing an illusion of movement of at least one of said first set of icons by illuminating said second set of icons in accordance with a predetermined sequence;
    a generator means for producing a predetermined audible response; and
    activating means electronically coupled to said pattern of electroluminescent material and said generator, said activating means for activating said generator means and said pattern, said generator means producing said predetermined audible response upon said second set of icons being sequentially illuminated.

2. The display panel of claim 1 wherein said first set of icons is adapted to be viewable with an unaided eye on a continuous basis, and said second set of icons is selectively viewable with said unaided eye, whereby said second set of icons is viewable upon said activating means illuminating said pattern.

3. The display panel of claim 1 wherein said first set of icons is adapted to reflect and absorb light impinging thereon, with said second set of icons adapted to be translucent.

4. The display panel of claim 1 wherein said second set of icons comprises of a plurality of electroluminescent regions and said activating means includes a sequencing circuit associated with said plurality of electroluminescent regions to selectively illuminate each of said plurality of regions in accord with said predetermined sequence.

5. The display panel of claim 1 wherein said generator means produces an audible response uniquely associated with one of said second set of icons.

6. The display panel of claim 1 wherein said generator means produces a succession of audible responses corresponding to said predetermined sequence.

7. The display panel of claim 1 wherein said generator means produces a succession of audible responses corresponding to said predetermined sequence, with each of said audible response of said succession being uniquely associated with one of said icons of said second set.

8. The display of claim 1 wherein said pattern is disposed between said layer and said activating means.

9. The display page of claim 1 wherein said activating means includes a flexible membrane having a first conductive element and a contact layer having a second conductive element, with said flexible membrane being spaced apart from said contact layer, placing said first and second conductive elements in opposing relation with an insulative layer disposed therebetween, said insulative layer having an aperture aligned with said first and second conductive elements.

10. The display page of claim 1 wherein said pattern comprises a plurality of electroluminescent regions disposed in said tier with each of said plurality of regions including a pair of spaced apart electrodes with electroluminescent phosphor disposed therebetween.

11. The display page of claim 1 wherein said pattern includes a plurality of electroluminescent regions and said activating means includes a sequencing circuit associated with said plurality of electroluminescent regions to selectively illuminate each of said plurality of regions in accord with said predetermined sequence.

12. The display page of claim 1 wherein said icon bearing layer is disposed proximate to said tier.

13. The display page of claim 1 wherein said activating means includes a flexible membrane having a first conductive element and a contact layer having a second conductive element, with said flexible membrane being spaced apart from said contact layer, placing said first and second conductive elements in opposing relation with an insulative layer disposed therebetween, said insulative layer having an aperture aligned with said conductive first and second conductive elements.

14. An interactive display panel comprising:
a layer bearing a plurality of icons, each of said icons being associated with one of a first set and a second set of icons, said first icon being adapted to be viewable with an unaided eye on a continuous basis, and said second set being selectively viewable with said unaided eye;
a tier of electroluminescent material forming a pattern corresponding to said second set of icons, said pattern providing an illusion of movement of said first set of icons by illuminating said second set of icons in accordance with a predetermined sequence; and
activating means electronically coupled to said electroluminescent material, for selectively illuminating said second set of icons in accordance with said predetermined sequence, whereby each icon of said second set of icons selectively becomes viewable with said unaided eye.

15. The display panel of claim 14 wherein said activating means includes a flexible membrane having a first conductive element and a contact layer having a second conductive element, with said flexible membrane being spaced apart from said contact layer, placing said first and second conductive elements in opposing relation with an insulative layer disposed therebetween, said insulative layer having an aperture aligned with said conductive first and second conductive elements and said pattern comprises a plurality of electroluminescent regions disposed in said tier with each of said plurality of regions including a pair of spaced apart electrodes with electroluminescent phosphor disposed therebetween.

16. The display panel of claim 15 further including a generator means for producing a predetermined audible response, wherein said activating means is electronically coupled to both said pattern of electroluminescent material and said generator, for simultaneously activating both said generator means and said pattern, with said generator means producing said predetermined audible response upon said second set of icons being illuminated in accord with said predetermined sequence.

17. The display panel of claim 16 wherein said activating means includes a sequencing circuit associated with said plurality of electroluminescent regions to selectively illuminate each of said plurality of regions in accord with said predetermined sequence, wherein said generator means produces a succession of audible responses corresponding to said predetermined sequence.

18. The display panel of claim 17 wherein each of said audible response of said succession are uniquely associated with one of said icons of said second set of icons.

19. An interactive display panel comprising:
a layer bearing a plurality of icons, each of said plurality of icons being associated with one of a first set and second set of icons;
a tier of electroluminescent material forming a pattern corresponding to said second set of icons, said pattern disposed to show a series of images corresponding to said first set of icons, providing an illusion of movement of said first set of icons upon said second set of icons being illuminated in accord with a predetermined sequence, said pattern comprising of a plurality of electroluminescent regions disposed in said tier with each of said plurality of regions including a pair of spaced apart electrodes with electroluminescent phosphor disposed therebetween;
a generator means for producing a predetermined audible response; and
means, electronically coupled to both said pattern of electroluminescent material and said generator, for simultaneously activating both said generator means and said pattern, with said generator means producing said predetermined audible response upon said second set of icons being illuminated in accord with said predetermined sequence, said activating means including a flexible membrane having a first conductive element and a contact layer having a second conductive element, with said flexible membrane being spaced apart from said contact layer, placing said first and second conductive elements in opposing relation with an insulative layer disposed therebetween, said insulative layer having an aperture aligned with said conductive first and second conductive elements.

20. The display panel of claim 19 wherein said activating means includes a sequencing circuit associated with said plurality of electroluminescent regions to selectively illuminate each of said plurality of regions in accord with said predetermined sequence, wherein said generator means produces a succession of audible responses corresponding to said predetermined sequence, with each of said audible response of said succession are uniquely associated with one of said figures of said second set.

* * * * *